(12) United States Patent
Vos et al.

(10) Patent No.: US 8,214,490 B1
(45) Date of Patent: Jul. 3, 2012

(54) COMPACT INPUT COMPENSATING REPUTATION DATA TRACKING MECHANISM

(75) Inventors: Jacob Vos, Quincy, MA (US); Igor Moochnick, West Roxbury, MA (US); Scott Wasson, Shrewsbury, MA (US); Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/560,382

(22) Filed: Sep. 15, 2009

(51) Int. Cl.
*G06F 15/173* (2006.01)

(52) U.S. Cl. .......................... 709/224; 709/206; 709/207

(58) Field of Classification Search .......... 709/223–224, 709/206–207
See application file for complete search history.

(56) References Cited

U.S. PATENT DOCUMENTS

| | | | | |
|---|---|---|---|---|
| 6,161,130 A * | 12/2000 | Horvitz et al. | ................. | 709/206 |
| 7,346,700 B2 * | 3/2008 | Gould et al. | ................... | 709/232 |
| 7,610,344 B2 * | 10/2009 | Mehr et al. | ..................... | 709/206 |
| 7,640,305 B1 * | 12/2009 | Arthur et al. | ................... | 709/206 |
| 7,756,878 B2 * | 7/2010 | Findley et al. | ................ | 707/748 |
| 2005/0015626 A1 * | 1/2005 | Chasin | .......................... | 713/201 |
| 2006/0004896 A1 * | 1/2006 | Nelson et al. | ................. | 707/206 |
| 2006/0026682 A1 * | 2/2006 | Zakas | ............................. | 726/22 |
| 2008/0016167 A1 * | 1/2008 | Lund et al. | .................... | 709/206 |
| 2008/0320093 A1 * | 12/2008 | Thorne | ......................... | 709/206 |
| 2009/0157675 A1 * | 6/2009 | Stellhorn et al. | ............. | 709/206 |

* cited by examiner

*Primary Examiner* — Philip B Tran
(74) *Attorney, Agent, or Firm* — Brill Law Office; Jeffrey Brill

(57) ABSTRACT

The reputations of content sources are tracked as running rates of content origination. Information concerning content origination from multiple sources is received and aggregated. The aggregated information is used to calculate running rates of content origination. An initial running rate of content origination can be calculated based on the number of detections of originations from a given source over a period of time. Running rates can be updated based on additional detections from the source since the last update. As incoming electronic content is received from specific sources, the running rates from given sources are used to determine whether to block or allow the incoming content. Reputation characterization percentages can be calculated based on the running rates, and incoming content from a specific source can be blocked if a reputation characterization percentage is above a given threshold.

21 Claims, 3 Drawing Sheets

COMPACT INPUT COMPENSATING REPUTATION DATA TRACKING MECHANISM

TECHNICAL FIELD

This disclosure pertains generally to computer security, and more specifically to tracking reputations of electronic content sources based on running origination rates.

BACKGROUND

Tracking the reputations of sources from which electronic data originates is an important form of computer security. For example, the reputations of email addresses and domains can be tracked to identify trustworthy versus potentially malicious email senders and file signatures. The amount of reputation data to track is becoming increasingly broad as malicious users abandon single point sources such as open proxies, and move to dispersed distribution methods such as the use of botnets and compromised webmail credentials. Tracking the reputations of dispersed sources requires larger and broader reputation databases to remain effective. As the number of database records increases to track reputation by sender email address, sender domain and Internet Protocol (IP) address (IPv4 or IPv6), reputation tracking uses large amounts of storage. For example, a traffic shaping device storing only 50 bytes per Internet Protocol Version 4 (IPv4) address in a 32 bit process space can store reputation information for approximately 50 million IP addresses. This may sound like a lot, but it is well below the potential 4 billion IPv4 address space size. Even if a central data warehouse is used to track large amounts of reputation data, it is desirable to store reputation data on the client side as well, for retrieval performance and storage data gathering.

As explained above, it is desirable to track the reputations of large numbers of electronic content sources. Yet, conventional reputation tracking systems can often not practicability store the amount of data required to do so, even on the server side. Furthermore, it is simply not possible for conventional reputation tracking systems to store such large amounts of data on the client side. It would be desirable to address these issues.

SUMMARY

A compact reputation tracking system tracks the reputations of sources of electronic content as one or more running rates of content origination. These running rates are compact, and thus can be maintained for a wide base of sources without requiring a lot of storage. The running rates at which different types of content originate from a source can be used to determine how trustworthy the source is, and consequently whether to accept or block content originating from that source. Information concerning origination of electronic content from at least one source over time is received and aggregated. This information can comprise, for example, notifications of the receipt of malicious or benevolent content, notifications of blocked content and notifications of received end-user complaints concerning content from specific sources. This received information can be provided by multiple computer systems for aggregation. The aggregated information concerning the origination of electronic content is used to calculate one or more running rates of content origination from the at least one source. For example, an initial running rate of content origination from a given source can be calculated based on the number of detections of originations of content of a given type from that source over a given period of time. Running rates can be updated based on additional detections of originations of content from the given source over a period of time since the last update. Older data can be given a higher weight in such calculations. As incoming electronic content is received from specific sources, the running rates from given sources can be used to determine whether to block or allow the incoming content. Examples of running rates that can be calculated and used in this context are a total running rate of content origination, a running rate of malicious content origination, a running rate of virus origination, a running rate of spam origination, a running rate of blocked content origination and a running rate of complaints concerning content origination. To use running rates to determine whether to block incoming electronic content from the specific source can comprise calculating at least one reputation characterization percentage based on the running rate(s), and blocking the incoming content from the specific source if a reputation characterization percentage is above a given threshold indicating that the source is not to be trusted in this context.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
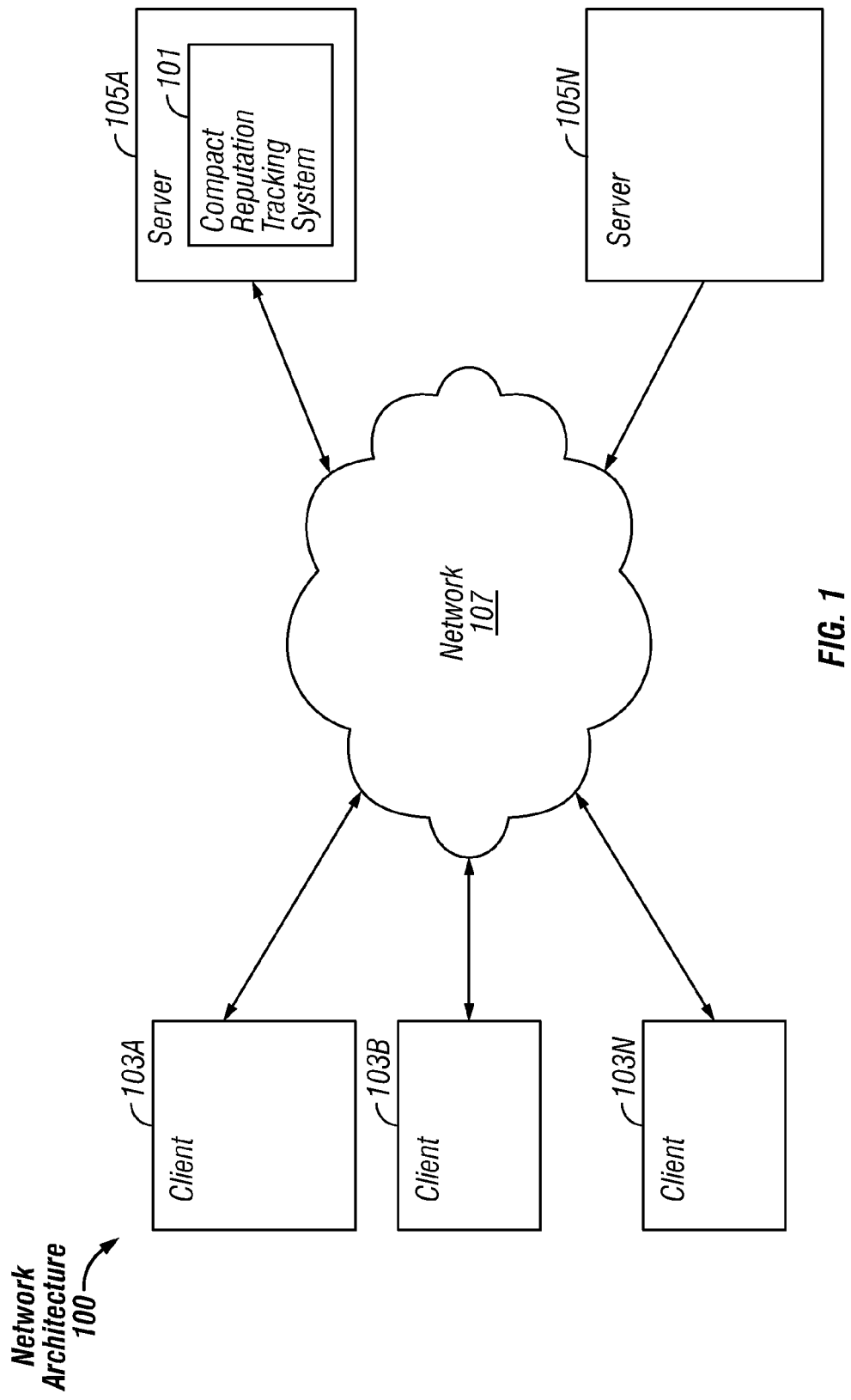
FIG. 1 is a block diagram of an exemplary network architecture in which a compact reputation tracking system can be implemented, according to some embodiments.

FIG. 1 is a block diagram illustrating an exemplary network architecture 100 in which a compact reputation tracking system 101 can be implemented. The illustrated network architecture 100 comprises multiple clients 103A, 103B and 103N, as well as multiple servers 105A and 105N. In FIG. 1, a compact reputation tracking system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet.

Figure 2:
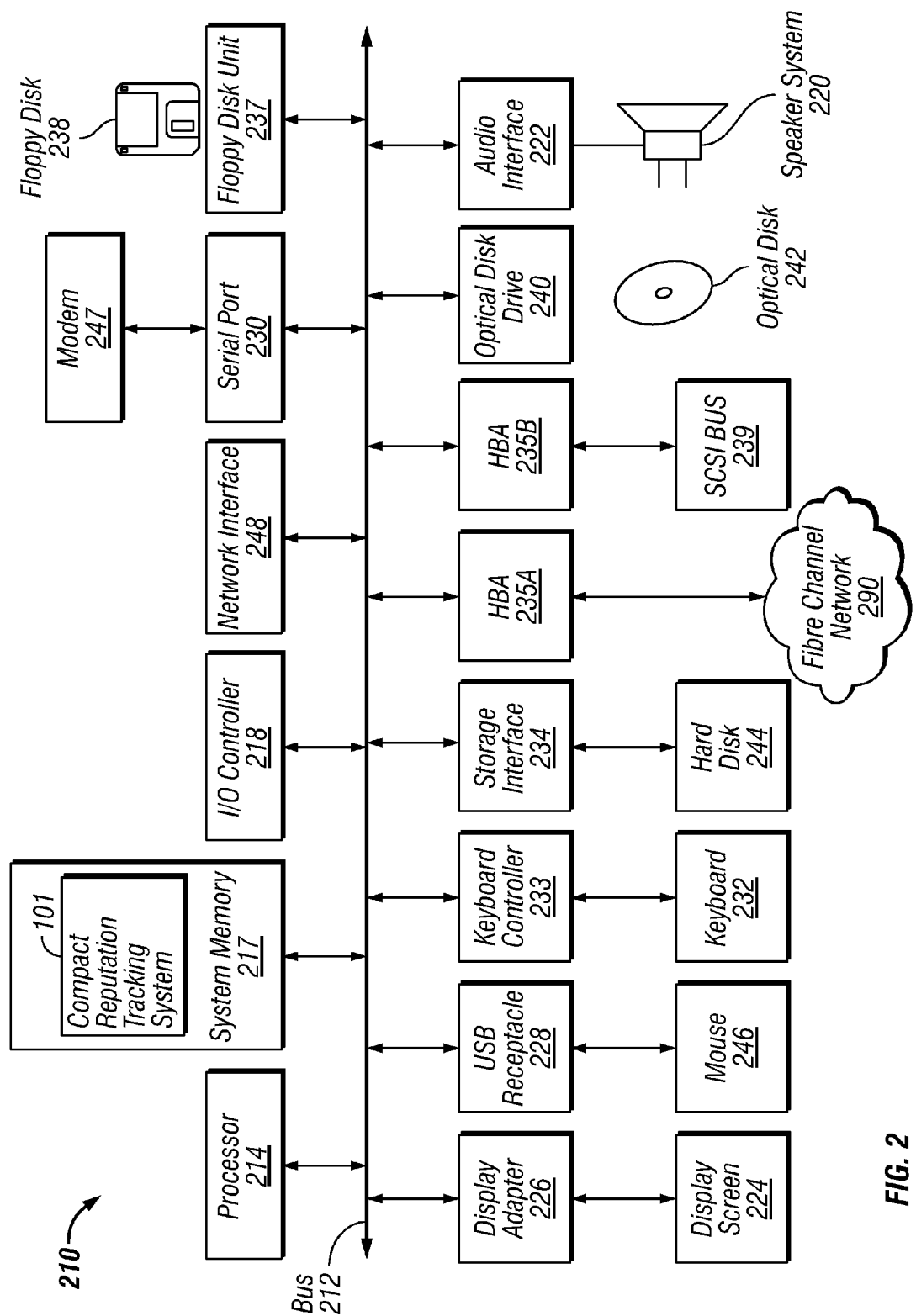
FIG. 2 is a block diagram of a computer system suitable for implementing a compact reputation tracking system, according to some embodiments.

FIG. 2 is a block diagram of a computer system 210 suitable for implementing a compact reputation tracking system 101. Both clients 103 and servers 105 can be implemented in the form of such computer systems 210. As illustrated in FIG. 2, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the compact reputation tracking system 101 is illustrated as residing in system memory 217. The workings of the compact reputation tracking system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
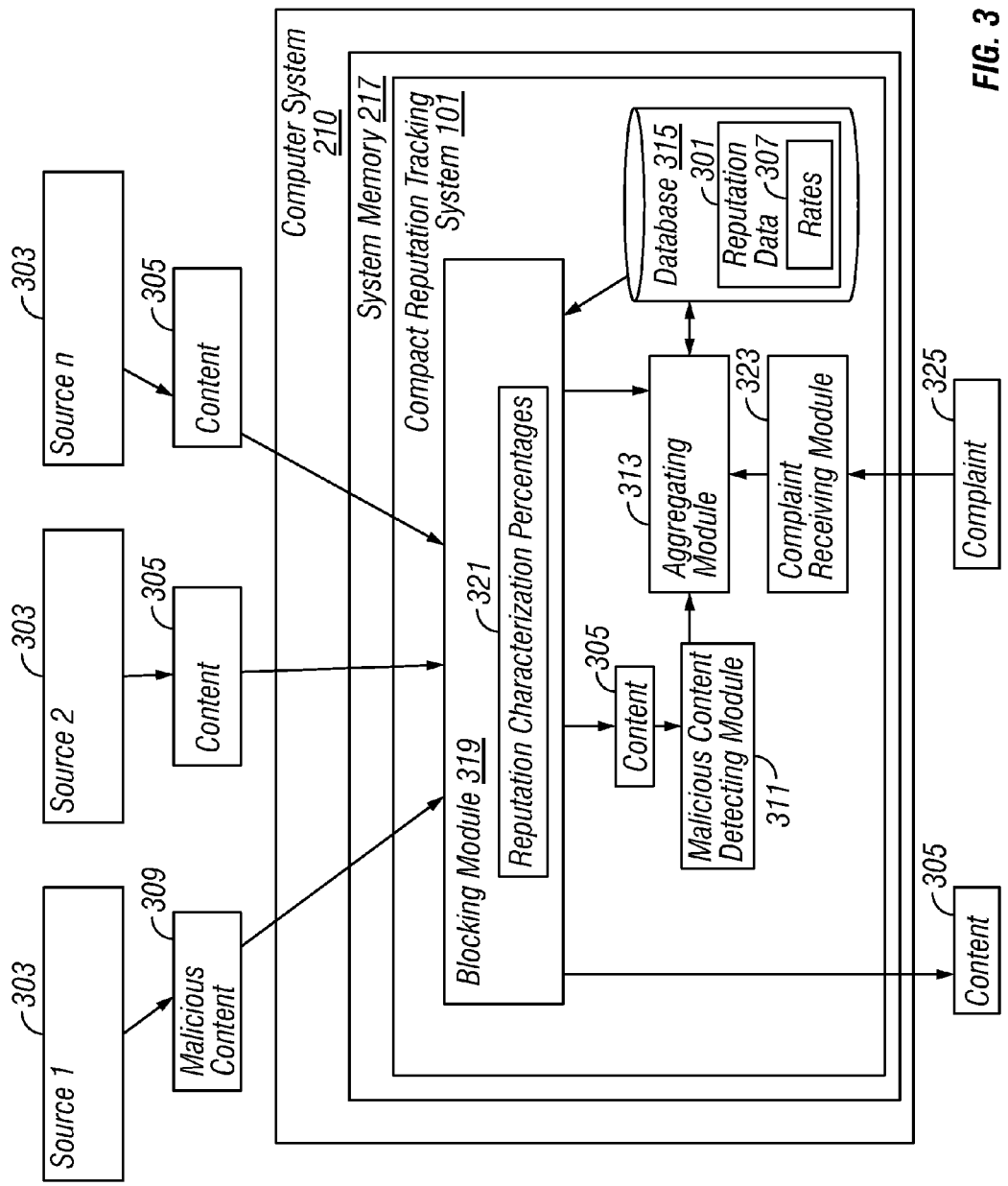
FIG. 3 is a block diagram of the operation of a compact reputation tracking system, according to some embodiments.

FIG. 3 illustrates a compact reputation tracking system residing in the system memory 217 of a single computer system 210. As described above, the functionalities of the compact reputation tracking system 101 can reside on a client 103, a server 105, or be distributed between multiple computer systems 210, including within a cloud-based computing environment in which the functionality of the compact reputation tracking system 101 is provided as a service over a network 107. It is to be understood that although the compact reputation tracking system 101 is illustrated in FIG. 3 as a group of modules, the illustrated Compact reputation tracking system 101 represents a collection of functionalities, which can be instantiated as a single or other multiple modules as desired. It is to be understood that the modules of the compact reputation tracking system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the compact reputation tracking system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the compact reputation tracking system 101 tracks reputation data 301 concerning multiple sources 303 of electronic content 305 as one or more rate(s) 307 of content 305 origination from tracked source 303 per period of time. For example, rates 307 of originated malicious content 309 (e.g., spam emails, viruses, worms, Trojan horses, spyware, etc.) and/or total originated content 305 per minute can be tracked for each source 303. The rate(s) 307 at which a given source 303 transmits, e.g., malicious content 309 and/or other content types is used to administer reputation based blocking of content 305 from that source 303. A rate 307 can be stored compactly, for example as a single integer per source 303, and thus reputation data 301 for a very broad set of sources 303 can be tracked without using a lot of storage.

As described below, the compact reputation tracking system 101 can effectively compensate for a variety of difficulties concerning reports of reputation data 301, such as sporadic reputation data reports 301, missing reputation data reports 301 or reputation data reports 301 from multiple and varying numbers of servers 105. The compact reputation tracking system 101 also supports administrating reputation based blocking according to origination percentages 321, while tracking only rates 307 per source 303 which are more compact.

Information concerning content 305 originating from multiple sources 303 is gathered in a variety of ways and aggregated. For example, as illustrated in FIG. 3, a malicious content detecting module 311 processes incoming content 305 from a variety of sources 303, and detects incoming malicious content 309. It is to be understood that the malicious content detecting module 311 can use any type of conventional detecting methodology to detect any type of malicious content 309 (e.g., heuristic spam detection, signature based virus detection, etc.). In addition to using conventional methodology to protect the target from the received malicious content 309, the malicious content detecting module 311 passes a notification concerning the processed incoming unit of content 305 to an aggregating module 313. The notification can identify whether or not the content 305 is malicious, if so the nature of the malicious content 309 (e.g., spam, virus, etc.), the time of receipt, and the source 303 from which it originated.

In various embodiments, more or different information concerning the receipt of incoming content 305 can be passed to the aggregating module 313 as desired. In some embodiments, the malicious content detecting module 311 only passes notifications concerning detected malicious content 309 to the aggregating module 313, and another component (e.g., a network interface 248) passes information to the aggregating module 313 concerning incoming content 305 generally. In addition, a complaint receiving module 323 can receive complaint submissions 325 from user users concerning content sources 303, and pass corresponding notifications to the aggregating module 313. It is to be understood that the aggregating module 313 can receive information concerning received content 305 from other modules as well, such as a blocking module 319, as described below.

The aggregating module 313 aggregates received notifications concerning incoming content 305 from multiple sources 303 into reputation data reports 301 for each source 301. These reputation data reports 301 can be stored in a database 315. The database 315 can store a reputation data report 301 for each source 303 being tracked. It is to be understood that in different embodiments, sources 303 can be tracked at different and even overlapping levels of granularity (e.g., individual email sender, email server, domain, sub domain, IP address, etc.). Each stored reputation data report 301 typically comprises an identifier of the source 303 (e.g., the IP address, domain, etc.) and a timestamp indicating the last update time of the report 301. The report can also store one or more rates 307 concerning the source 303, such as the running rate 307 of incoming units of content 305 (e.g., messages) per period of time (e.g., minute), the running rate 307 of detected units of malicious content 309 (e.g., spam messages, viruses) per period of time, the running rate 307 of blocked units of content 317 per period of time (as reported by the blocking module 319, as described below), the running rate 307 of end user complaints per period of time, etc. It is to be understood that these are examples of the types of rates 307 that can be tracked. In some embodiments, fewer, different or more rates 307 are tracked per source 303. For example, rather than tracking a single rate 307 of detected units of malicious content 309 per time period, separate rates 307 for different types of malicious content 309 (e.g., spam, viruses, etc.) can be tracked. The total number of units of incoming content 309 observed from the source 303 can also be tracked, to ensure an adequate sample size. The specific format of reputation data reports 301 is a variable design parameter.

The aggregating module 313 receives information concerning incoming content 305 arriving from multiple sources 303, and maintains a reputation data report 301 for each source 303. Each reputation data report 301 comprises at least one running rate 307 for content 305 originating from that source 303. The aggregating module 313 can update a reputation data report 301 every time it receives information concerning the receipt of content 305 from the corresponding source 303, or it can save content receipt notifications and update reputation data reports 301 periodically (e.g., per period of time, based on amount of new information, or when making a blocking determination as described below). If there is no existing report 301 for a given source 303, to create the initial first report 301 for that source 303 the aggregating module 313 uses the span of time over which the content receipt notifications it is aggregating were received, in order to calculate initial rate(s) 307 for the source 303. From that point on, subsequent notifications of incoming content 305 are aggregated into running rates 307, for example by applying a formula such as the one implemented by the pseudo-code in Table 1:

TABLE 1

// calculated the amount of time elapsed since the last update
elapsed_time = MinsSince1970(currentTime( ) ) – sinsSince1970(Sender.lastUpdateTime)
// compensate for long report timespan over several periods by decreasing count by number of periods
If( elapsed_time greaterThan 0 )
   incomingRate = (count / elapsed_time)
   // compute new rate with weighted average of old and new rates
   rate = ( incomingRate + (rate * (weight – 1)) ) / weight
Else // increase rate for current time period by reweighting prior value
   rate = ( count + (rate * weight ) ) / weight The formula applied by the pseudo-code in Table 1 uses a weight parameter, which controls the rate of decay of old data. Larger weight values reduce acceleration of rate changes by giving more weight to older data. In this example, the weight can be greater than or equal to one. A weight of one effectively retains no history data. Progressively greater values give progressively greater weight to old data. The specific weight value to use is a variable design parameter. It is to be understood that the pseudo-code in Table 1 is simply an example of how the aggregating module 313 can maintain running rates 307 over time based on information concerning incoming content 305. Another example is given by the formula below. More specifically, to calculate a new running rate 307 as a variant of an old running rate 307 and weighing the value of the old rate 307 by using a constant K, the aggregating module 313 can apply the formula:

new rate=$(N_1/\Delta + O_1(K-1))/K$, wherein O=the old rate 307, N=the new message count, $\Delta$=the elapsed time since the last entry and K=the weighting constant.

It is to be understood that because the amount of time since the last update is taken into account when calculating the running rates 207, the reputation data reports 301 remain accurate even if new information comes in sporadically, or specific new information is missed. It is to be further understood that although for clarity of illustration and description FIG. 3 illustrates the aggregating module 313 receiving information concerning incoming content 305 from a single set of modules on a single computing system 210, in some embodiments a centralized aggregating module 313 receives information from a plurality of module sets, each monitoring the receipt of incoming content 305 on a separate computing system 210. In these embodiments, the formula used to calculate an updated rate 307 is adjusted to account for this. For example, the formula given above can be adjusted to:

new rate=$(N_1+O_1K)/K$

When an incoming unit of content 305 is received, a blocking module 319 can obtain a current reputation data report 301 for the source 303 from the aggregation module 313, and determine whether to block the unit of content 305 based on the reputation of the source 303. It is to be understood that the aggregating module 313 can create a current reputation data report 301 for the source 303 responsive to the request, or supply a most recently created reputation data report 301. In one embodiment, the blocking module 319 can use the raw rate(s) 307 in the report 301 to calculate reputation characterization percentages 321 on the fly, in order to make its blocking determinations. For example, the blocking component 319 can determine the percentage 321 of content 305 from the source 303 that is malicious 309 by dividing the malicious content rate 307 in the corresponding reputation data report 301 by the received content rate 307 in the report 301. Reputation characterization percentages 321 can also be calculated at greater levels of granularity, such as spam percentage 321 (e.g., calculated as the sum of the spam and blocked message rates 307 over the received content rate 307), virus percentage 321 (e.g., calculated as viruses per minute over messages per minute), complaint percentage 321 (e.g., the complaint rate 307 divided by the remainder of the received content rate 307 minus the spam rate 307 minus the virus rate 307 minus the blocked message rate 307), blocked message percentage 321 (blocked message rate 307 over received message rate 307) and sampled percentage 321 (e.g., the spam rate 307 over the remainder of the received message rate 307 minus the blocked message rate 307). The blocking module 319 can block an incoming unit of content 305 responsive to one or more reputation characterization percentages 321 being greater than a given threshold. It is to be understood that what threshold(s) to use to determine to block incoming content 305 is a variable design parameter. Different threshold values can be used in different embodiments, for different reputation characterization percentages 321, and under other different circumstances as desired. In some embodiments, rather than or in addition to calculating reputation characterization percentages 321, the blocking module 319 can determine what incoming content 305 to block based on raw rates 307 concerning the originating sources 303. For example, if the spam rate 307 for a given source 303 is too high (e.g., above a given threshold), the blocking module 319 can block incoming email messages 305 originating from that source 303. When the blocking module 319 blocks incoming content 305, it can transmit a notification concerning the blocked content 317 to the aggregation module 313, to be used as described above.

As explained above, using the compact reputation tracking system 101 allows the tracking of reputation data 301 using rates 307 and percentages 321, with minimal storage overhead. Additionally, the compact reputation tracking system 101 enables normalization of input according to time, maintains a last reputation data report 301, can adjust for sporadic or longer duration input to a periodic rate 307, can re-average multiple inputs so that many sources can contribute reputation data 301, holds the average for last reported data 301, even when new input ceases, and does not require a "closing of time bucket" to accurately maintain rates 307, as rates 307 are computed only when reports 301 are updated.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for determining whether to block incoming electronic content based on running rates of content origination from sources, the method comprising the steps of:
   receiving, by a destination computer, information concerning origination of incoming electronic content received from at least one external source over time;
   aggregating, by the destination computer, the received information concerning origination of electronic content from the at least one source, wherein the received information comprises notifications from multiple sources;
   calculating, by the destination computer, at least one running rate of content origination from the at least one source, based on aggregated information concerning origination of electronic content from the at least one source, wherein the running rate is indicative of a reputation of the at least one source, and wherein the running rate comprises a single number updated using at least an amount of time since the last update to control an influence of new information on the running rate;
   receiving, by the destination computer, incoming electronic content from a specific source; and
   determining, by the destination computer, whether to block the incoming electronic content from the specific source responsive to at least one running rate of content origination from the specific source.

2. The method of claim 1 wherein receiving, by the destination computer, information concerning origination of electronic content from at least one source over time further comprises:
   receiving, by a computer, at least one notification that malicious content was received from a given source at a given time.

3. The method of claim 1 wherein receiving, by the destination computer, information concerning origination of electronic content from at least one source over time further comprises:
   receiving, by a computer, at least one notification that non-malicious content was received from a given source at a given time.

4. The method of claim 1 wherein receiving, by the destination computer, information concerning origination of electronic content from at least one source over time further comprises:
   receiving, by a computer, at least one notification that a complaint was received at a given time concerning content from a given source.

5. The method of claim 1 wherein receiving, by the destination computer, information concerning origination of electronic content from at least one source over time further comprises:
   receiving, by a computer, at least one notification that content from a given source was blocked at a given time.

6. The method of claim 1 wherein receiving, by the destination computer, information concerning origination of electronic content from at least one source over time further comprises:
   receiving, by a computer, notifications concerning receipt of content from given sources, the received notifications originating from a plurality of computer systems.

7. The method of claim 1 wherein calculating, by a computer, at least one running rate of content origination from the at least one source, based on aggregated information concerning origination of electronic content from the at least one source further comprises:
calculating, by a computer, at least one initial running rate of content origination from a given source, based on a number of detections of originations of content from the given source and a period of time over which the detections where made.

8. The method of claim 1 wherein calculating, by the destination computer, at least one running rate of content origination from the at least one source, based on aggregated information concerning origination of electronic content from the at least one source, further comprises:
updating, by a computer, a current running rate of content origination from a given source, based on the current running rate, a number of detections of originations of content from the given source since the running rate was last updated, and an amount of time since the running rate was last updated.

9. The method of claim 8 wherein updating, by the destination computer, a current running rate of content origination from a given source further comprises:
weighing, by a computer, previous detections of originations of content and current detections of originations of content differently.

10. The method of claim 1 wherein updating, by the destination computer, a current running rate of content origination from a given source further comprises:
updating, by a computer, the current running rate responsive to receiving, by a computer, incoming electronic content from a specific source.

11. The method of claim 1 wherein calculating, by the destination computer, at least one running rate of content origination from the at least one source, based on aggregated information concerning origination of electronic content from the at least one source, further comprises calculating, by a computer, at least one running rate of content origination from a group consisting of:
a running rate of malicious content origination;
a running rate of virus origination; and
a running rate of spam origination.

12. The method of claim 1 wherein determining, by the destination computer, whether to block the incoming electronic content from the specific source responsive to at least one running rate of content origination from the specific source further comprises:
calculating, by a computer, at least one reputation characterization percentage based on at least one running rate of content origination from the specific source; and
determining, by a computer, whether to block the incoming electronic content from the specific source responsive to the at least one reputation characterization percentage.

13. The method of claim 1 wherein determining, by the destination computer, whether to block the incoming electronic content from the specific source responsive to at least one running rate of content origination from the specific source further comprises:
responsive to results of the determining step, blocking, by a computer, the incoming electronic content from the specific source.

14. The method of claim 1 wherein determining, by the destination computer, whether to block the incoming electronic content from the specific source responsive to at least one running rate of content origination from the specific source further comprises: responsive to results of the determining step, not blocking, by a computer, the incoming electronic content from the specific source.

15. The method of claim 1 wherein receiving, by a destination computer, information concerning origination of incoming electronic content received from at least one external source over time comprises electronic content received from at least one of:
an individual e-mail sender;
an e-mail server;
a domain;
a sub-domain; and
an IP address.

16. At least one non-transitory computer readable storage medium storing a computer program product for determining whether to block incoming electronic content based on running rates of content origination from sources, the computer program product comprising:
program code for receiving, by a destination computer, information concerning origination of incoming electronic content received from at least one external source over time;
program code for aggregating the received information concerning origination of electronic content from the at least one source, wherein the received information comprises notifications from multiple sources;
program code for calculating at least one running rate of content origination from the at least one source, based on aggregated information concerning origination of electronic content from the at least one source, wherein the running rate is indicative of a reputation of the at least one source, and wherein the running rate comprises a single number updated using at least an amount of time since the last update to control an influence of new information on the running rate;
program code for receiving incoming electronic content from a specific source; and
program code for determining whether to block the incoming electronic content from the specific source responsive to at least one running rate of content origination from the specific source.

17. The computer program product of claim 16 wherein the program code for receiving, by the destination computer, information concerning origination of electronic content from at least one source over time further comprises program code for performing at least one step from a group of steps consisting of:
receiving at least one notification that malicious content was received from a given source at a given time;
receiving at least one notification that non-malicious content was received from a given source at a given time;
receiving at least one notification that a complaint was received at a given time concerning content from a given source;
receiving at least one notification that content from a given source was blocked at a given time; and
receiving notifications concerning receipt of content from given sources, the received notifications originating from a plurality of computer systems.

18. The computer program product of claim 16 wherein the program code for calculating at least one running rate of content origination from the at least one source, based on aggregated information concerning origination of electronic content from the at least one source further comprises:
program code for calculating at least one initial running rate of content origination from a given source, based on a number of detections of originations of content from the given source and a period of time over which the detections where made; and program code for updating a current running rate of content origination from a given source, based on the current running rate, a number of detections of originations of content from the given source since the running rate was last updated, and an amount of time since the running rate was last updated.

19. The computer program product of claim 16 wherein the program code for calculating at least one running rate of content origination from the at least one source, based on aggregated information concerning origination of electronic content from the at least one source, further comprises program code for calculating at least one running rate of content origination from a group consisting of:

a running rate of malicious content origination;
a running rate of virus origination; and
a running rate of spam origination.

20. The computer program product of claim 16 wherein the program code for determining whether to block the incoming electronic content from the specific source responsive to at least one running rate of content origination from the specific source further comprises:

program code for calculating at least one reputation characterization percentage based on at least one running rate of content origination from the specific source; and program code for determining whether to block the incoming electronic content from the specific source responsive to the at least one reputation characterization percentage.

21. A destination computer system configured to determine whether to block incoming electronic content based on running rates of content origination from sources, the computer system comprising:

a processor;

system memory;

an aggregating module to receive information concerning origination of electronic content received from at least one external source over time and aggregating the received information concerning origination of electronic content from the at least one source, wherein the received information comprises notifications from multiple sources; and a blocking module to calculate at least one running rate of content origination from the at least one source, based on aggregated information concerning origination of electronic content from the at least one source, wherein the running rate is indicative of a reputation of the at least one source, and wherein the running rate comprises a single number updated using at least an amount of time since the last update to control an influence of new information on the running rate, wherein the aggregating module receives incoming electronic content from a specific source, wherein the blocking module determines whether to block the incoming electronic content from the specific source responsive to at least one running rate of content origination from the specific source.

* * * * *